United States Patent [19]

Inoue et al.

[11] Patent Number: 5,502,146

[45] Date of Patent: Mar. 26, 1996

[54] METHOD OF PRODUCING SILICONE RUBBER COMPOSITIONS

[75] Inventors: Yoshio Inoue; Masaharu Takahashi; Minoru Igarashi; Susumu Sekiguchi, all of Annaka, Japan

[73] Assignee: Shin-Etsu Chemical Co., Ltd., Tokyo, Japan

[21] Appl. No.: 298,860

[22] Filed: Aug. 31, 1994

[30] Foreign Application Priority Data

Aug. 31, 1993 [JP] Japan ................................. 5-239096

[51] Int. Cl.$^6$ ..................................................... C08G 77/04
[52] U.S. Cl. .............................. 528/34; 528/38; 525/477; 523/209; 523/212
[58] Field of Search ..................... 528/38, 34; 525/477; 523/209, 212

[56] References Cited

U.S. PATENT DOCUMENTS

| | | | |
|---|---|---|---|
| 3,766,128 | 10/1973 | Brady et al. | 528/38 |
| 3,796,686 | 3/1974 | Golitz et al. | 528/38 |
| 4,528,353 | 7/1985 | Lucas et al. | 528/34 |
| 4,585,849 | 4/1986 | Saykowski et al. | 528/34 |
| 5,140,061 | 8/1992 | Feder | 528/38 |

*Primary Examiner*—Melvyn I. Marquis
*Attorney, Agent, or Firm*—Cushman Darby & Cushman

[57] ABSTRACT

A method of producing a silicone rubber composition, comprising heating a mixture of an organopolysiloxane having a silanol group at both the ends of the molecular chain, a end blocking agent, such as a triorganosilanol, a silane or a siloxane having two dialkylaminosilyl groups in the molecule, and a reinforcing filler thereby carrying out chain lengthening and end blocking of said organopolysiloxane. According to this method, a silicone rubber composition whose low-molecular siloxane content is held down remarkably can be produced without consuming a large amount of energy for the mixing.

9 Claims, No Drawings

METHOD OF PRODUCING SILICONE RUBBER COMPOSITIONS

BACKGROUND OF THE INVENTION

1. Field of the Invention

The present invention relates to a method of producing an organopolysiloxane composition, and more particularly to a method of producing a silicone rubber composition containing less amounts of low-molecular siloxanes by polymerizing an organopolysiloxane in the presence of a reinforcing filler.

2. Description of the Prior Art

Since silicone rubbers have such excellent properties as weather resistance, electrical properties, low-compression set, heat resistance, cold resistance, and the like, they are widely used in various fields including, for example, the fields of electronic equipment, automobiles, building, medical treatment, and food. Their typical applications include, for example, rubber contacts used as rubber contact keys of remote controllers, typewriters, word processors, computer terminals, and musical instruments; gaskets for building; various rolls, such as rolls for copying machines, development rolls, transfer rolls, charge rolls, and sheet feeding rolls; rubber vibration insulators of audio equipment or the like; and packings for compact disks used in computers.

The silicone rubbers used in the above applications are provided generally in the form of a composition containing an organopolysiloxane having a high degree of polymerization and a reinforcing filler. This composition is prepared by mixing a raw material, a polymer, with a reinforcing filler and various dispersants by using a mixer, for example, a dough mixer or a two-roll.

Incidentally, as shown, for example, in US Pat. No. 2,634,252, generally, the organopolysiloxane having a high degree of polymerization that is a base component of the above silicone rubber is produced by polymerizing an organopolysiloxane having a low molecular weight in the presence of an equilibration catalyst, such as potassium hydroxide, a potassium silanolate, lithium silanolate, and a tetraalkylammonium hydroxide. Since the thus obtained organopolysiloxane having a high degree of polymerization is highly viscous, there is the problem that, in the production of the above silicone rubber composition, when the organopolysiloxane is mixed with a reinforcing filler, a large amount of energy is needed.

To solve the above problem, for example, Japanese Preexamination Patent Publication (KOKAI) Nos. 59-176322, 59-176324, 59-176325, and 59-176326 suggest methods wherein an organosiloxane oligomer having a relatively low viscosity is mixed with a filler and is polymerized in the presence of a catalyst, such as sulfuric acid, sulfonic acid, a quaternary ammonium carboxylate, and a carboxylate, thereby simultaneously carrying out polymerization of the organopolysiloxane and preparation of a silicone rubber composition.

According to the above methods, although indeed a desired silicone rubber composition can be obtained using relatively low energy, a step of neutralizing and deactivating the catalyst used is required and, further because the organopolysiloxane is polymerized by equilibration, low-molecular siloxanes are produced concomitantly, and a step of removing the low-molecular siloxanes is required, which is a defect.

Further, at present, in various fields, it is strongly demanded that low-molecular siloxanes contained in silicone rubbers are reduced. For example, in the case of contact rubbers used for contact keys, there is the problem that low-molecular siloxanes cause a contact failure, and in the case of roll materials for copying machines, there is the problem that an offset phenomenon occurs, that is, a toner is transferred onto the roll through low-molecular siloxanes. In the case of building gaskets or the like, it is known that the substance that causes their surroundings to be soiled is low-molecular siloxanes remaining in the organopolysiloxane that is the raw material.

The production methods suggested in the above prior art require an additional step to reduce low-molecular siloxanes and is not satisfactory in the attainable level to which low-molecular siloxanes are reduced.

SUMMARY OF THE INVENTION

Therefore, an object of the present invention is to provide a method of producing a silicone rubber composition containing an organopolysiloxane having a high degree of polymerization and a reinforcing filler with the contents of low-molecular siloxanes lowered without consuming a large amount of energy.

According to the present invention, there is provided a method of producing a silicone rubber composition, comprising the steps of:

mixing (A) an organopolysiloxane having a silanol group at both the ends of the molecular chain represented by the following general formula (1):

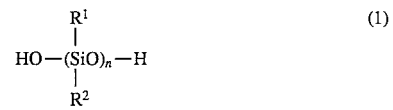

wherein $R^1$ and $R^2$ which are the same or different, each represent a substituted or unsubstituted monovalent hydrocarbon group and n is an integer of 2 to 3,000, (B) an organosilicon compound represented by the following general formula (2):

wherein a is 1 or 2, $R^3$, $R^4$, and $R^5$, which are the same or different, each represent a substituted or unsubstituted monovalent hydrocarbon group, when a is 1, Z represents a hydroxyl group, a halogen atom, or —$NR^6R^7$, and when a is 2, Z represents >NX in which $R^6$ and $R^7$, which are the same or different, each represent a substituted or unsubstituted monovalent hydrocarbon group, and X represents a hydrogen atom or a substituted or unsubstituted monovalent hydrocarbon group, (C) a silane or a siloxane containing two dialkylaminosilyl groups in the molecule or a mixture of these, and (D) a reinforcing filler, and heating the resulting mixture thereby lengthening the chain of the organopolysiloxane (A).

The total content of low-molecular siloxanes, for example, represented by the following formula (3):

$$\begin{array}{c} R^1 \\ | \\ (SiO)_p \\ | \\ R^2 \end{array} \quad (3)$$

wherein $R^1$ and $R^2$ have the same meanings as defined above and p is an integer of 25 or below, contained in the silicone rubber composition obtained by this method is 5,000 ppm or below, and in particular in the case where low-molecular siloxanes in the organopolysiloxane (A) represented by the above general formula (1) used as a raw material are removed sufficiently, the total content of low-molecular siloxanes of the above formula (3) becomes 2,000 ppm, which shows that the production thereof is suppressed quite effectively.

Further, according to the present invention, the polymerization of the organopolysiloxane (A), that is, the lengthening of the chain thereof, is carried out in the presence of a reinforcing filler. Therefore, since the organopolysiloxane (A) in the stage wherein it is mixed with a reinforcing filler is itself low in viscosity, the mixing does not require a large amount of energy.

The organosilicon compound (B) represented by the above general formula (2) acts as an end blocking agent and the silane or siloxane (C) having two dialkylaminosilyl groups in the molecule acts as a catalyst for the condensation polymerization reaction for the lengthening of the chain of the above organopolysiloxane (A).

DETAILED DESCRIPTION OF PREFERRED EMBODIMENTS

(A) Organopolysiloxanes

As the organopolysiloxane used as a starting raw material in the present invention, an organopolysiloxane having a silanol group at both the ends of the molecular chain represented by the above general formula (1) is used.

In the general formula (1), $R^1$ and $R^2$ each represent an unsubstituted or substituted monovalent hydrocarbon group, and, specifically, examples include an alkyl group, such as a methyl group, an ethyl group, and a propyl group, an alkenyl group, such as a vinyl group and an allyl group, a cycloalkyl group, such as a cyclohexyl group, an aryl group, such as a phenyl group and a tolyl group, an aralkyl group, such as a benzyl group and a phenylethyl group, and a corresponding substituted group that is formed by replacing part or all of the hydrogen atoms of these groups with a halogen atom(s), a cyano group(s), or the like, such as a chloromethyl group, a trifluoropropyl group, a cyanoethyl group, and an α-cyanophenylethyl group.

Further, n is an integer representing the degree of polymerization and is an integer of 2 to 3,000, and more preferably an integer of 10 to 1,000 from an economical point of view.

In the present invention, with a view to holding down the amounts of low-molecular siloxanes, out of the above organopolysiloxanes, organopolysiloxanes wherein cyclic siloxanes that are not involved in the polymerization are previously removed as far as possible by an elimination procedure, such as stripping, are preferably used, and most preferably organopolysiloxanes that are obtained by ring-opening polymerization of cyclic trisiloxanes are used.

(B) Organosilicon compounds

In the present invention, an organosilicon compound represented by the above general formula (2) is used as an end blocking agent. By carrying out the lengthening of the chain of the above organopolysiloxane (A) in the presence of this end blocking agent, an organopolysiloxane having a high degree of polymerization whose ends are blocked with triorganosilyl groups is formed. That is, since the organopolysiloxane having a high degree of polymerization obtained by chain-lengthening by the condensation polymerization reaction catalyzed with the below-mentioned silane or siloxane (C) has ends of the molecular chain blocked with a silyl group having an alkylamino group, this end blocking agent reacts quickly, and triorganosilyl groups are introduced to the ends of the molecule.

In the above general formula (2), the monovalent hydrocarbon groups $R^3$ to $R^5$ includes monovalent hydrocarbon groups that are the same as those that exemplify $R^1$ in the above general formula (1), and as X, a hydrogen atom, a lower alkyl group having 5 or less carbon atoms, and a cycloalkyl group are preferable. Typical examples of this organosilicon compound include the following:

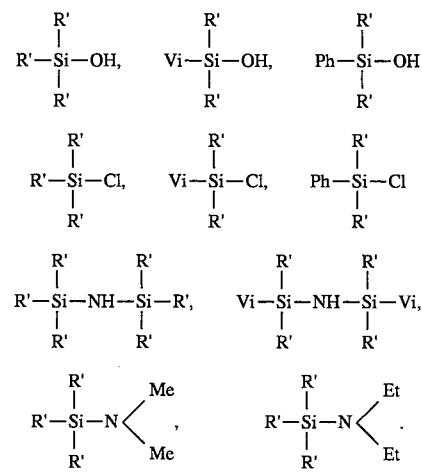

In the above formulae, R' represents a lower alkyl group having 5 or less carbon atoms, such as a methyl group, an ethyl group, and a propyl group, Me represents a methyl group, Et represents an ethyl group, Ph represents a phenyl group, and Vi represents a vinyl group.

In the present invention, the amount of the end blocking agent to be used for the above end blocking is suitably in the range of 0.001 to 1 part by weight, and in particular 0.05 to 0.5 part by weight, per 100 parts by weight of the organopolysiloxane (A), a starting raw material. If the amount is less than 0.001 part by weight, it is difficult to carry out the blocking of ends effectively, while if the amount is larger than 1 part by weight, it becomes difficult to form an organopolysiloxane having a high degree of polymerization and there is a fear that it causes the formation of low-molecular siloxanes.

(C) Silanes or siloxanes

In the present invention, as the reaction catalyst to cause the organopolysiloxane, a raw material, to be subjected to condensation polymerization to lengthen the chain, a silane or siloxane containing two dialkylaminosilyl groups in the molecule is used. Such a silane or siloxane includes, for example, a compound represented by the following general formula (4)

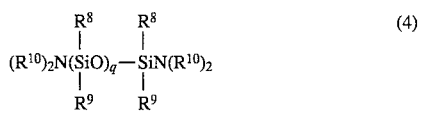

wherein $R^8$ and $R^9$, which are the same or different, each represent a substituted or unsubstituted monovalent hydrocarbon group, $R^{10}$ represents an alkyl group, and q is an integer of 0 to 1,000.

In the general formula (4), typical examples of the unsubstituted or substituted hydrocarbon groups $R^8$ and $R^9$ include the same groups as those that exemplify $R^1$ and $R^2$, in particular, preferably $R^8$ represents an alkyl group, such as a methyl group, a vinyl group, a trifluoropropyl group, and a phenyl group, and preferably $R^9$ represents an alkyl group, such as a methyl group. Further, preferably $R^{10}$ represents an alkyl group having 4 or less carbon atoms. Further, q is preferably an integer of 1 to 100. As a general trend, the smaller the value of q is, the greater the catalytic activity is.

Specific examples of the catalyst includes the following:

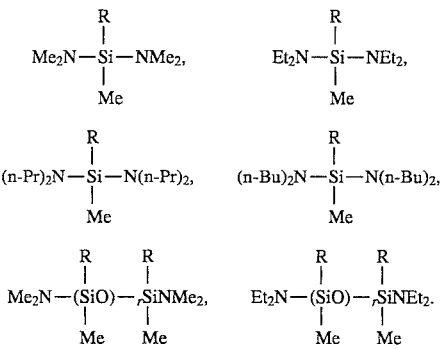

In the above formulae, R represents an alkyl group, such as a methyl group, a vinyl group, a trifluoropropyl group, or a phenyl group, Me represents a methyl group, Et represents an ethyl group, Pr represents a propyl group, Bu represents a butyl group, and r is an integer of 1 to 100.

The above silane or siloxane is used in such an amount that the molar ratio of the silanol group to the dialkylamino group in the mixture is from 0.5 to 3.0, and particularly 0.8 to 1.5.

(D) Reinforcing fillers

In the present invention, as the reinforcing filler, fine particles conventionally used as a reinforcing filler for silicone elastomers are used. Examples thereof include fumed silica, wet process silica, fumed silica and wet process silica whose surface has been made hydrophobic, quartz fine particles, diatomaceous earth, carbon black, calcium carbonate, glass fiber, and synthetic fiber. Further, from the standpoints that the reinforcing is made satisfactory and that uniform mixing with other components is easily carried out, the specific surface area of these is preferably in the range of 1 to 600 m²/g.

In order to improve the workability of the obtainable silicone composition, it is desirable that the surface of the above reinforcing filler has been made hydrophobic with an organosilicon compound. The organosilicon compound for such surface treatment includes, for example, a silazane, such as hexamethylsilazane and hexaethylsilazane; a cyclosiloxane, such as hexamethylcyclotrisiloxane and octamethylcyclotetrasiloxane; a linear organosiloxane, such as a dimethylpolysiloxane; a chlorosilane, such as dimethyldichlorosilane and methyltrichlorosilane; and an alkylsilane, such as monomethylsilane. In particular, fumed silica and wet process silica whose surface has been made hydrophobic are particularly preferable.

With a view of the reinforcing ability and workability, the above-described reinforcing filler is used in an amount of 1 to 300 parts by weight, and particularly 2 to 100 parts by weight, per 100 parts by weight of the total amount of the above components (A) to (C).

Preparation of the silicone rubber composition

In the present invention, the intended silicone rubber composition can be obtained by mixing uniformly the above components (A) to (D) to prepare a mixture and heating the mixture to carry out the polymerization by lengthening the chain of the organopolysiloxane.

To prepare the above mixture, the components may be mixed at a time, but generally it is desirable that after the components (A) to (D) are mixed, the reinforcing filler (D) is mixed.

The heating to polymerize the organopolysiloxane (A) is carried out for about several hours to about several days at a temperature in the range of room temperature (25° C.) to 200° C. In this case, if, as the above silane or siloxane (C) that is a catalyst, a volatile silane or a siloxane is used, it is possible that after condensation is carried out at room temperature to a certain extent, the reaction is continued by heating to 150° to 180° C. to obtain quickly the intended organopolysiloxane having a high degree of polymerization. By carrying out such heating, the average degree of polymerization of the obtained organopolysiloxane (A) that will serve as a base can be controlled in concert with the original viscosity of the component (A) and the mixed ratio of the components (A), (B), and (C), and the average degree of polymerization of the obtained polymerization is 3,000 or more, with preference given to 5,000 to 10,000, taking the workability into consideration.

As the apparatus for preparing and heating the above-described mixture, for example, a kneader, such as a dough mixer, a pressurized kneader, a gate mixer, a Shinagawa mixer, a one-shaft continuous kneader, and a two-shaft continuous kneader, which is equipped with a heating apparatus can be preferably used.

The end blocking reaction that is simultaneously carried out with the chain lengthening of the organopolysiloxane (A) can be represented, for example in the case wherein an organosilicon compound (B) having the above general formula (2) in which Z represents a hydroxyl group is used as an end blocking agent, by the following equation:

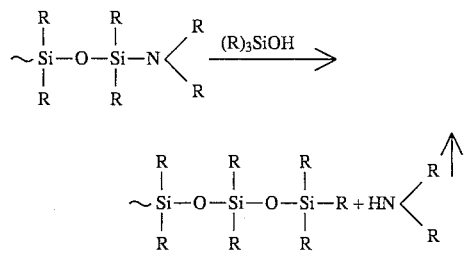

wherein organic groups and the like bonded to the silicon atoms are all represented by R for the sake of convenience.

In the thus obtained silicone rubber composition, the content of low-molecular siloxanes having a degree of polymerization, for example, of 25 or below is 5,000 ppm or below, and in the case wherein the content of low-molecular siloxanes contained in the raw material organopolysiloxane is very low, the content of low-molecular siloxanes in the obtained silicone rubber composition is 2,000 ppm or below, and this silicone rubber composition can be used effectively in various fields wherein low-molecular siloxanes are obnoxious. Further this silicone rubber composition can be easily kneaded, for example, by a two-roll and, similarly to conventionally known silicone rubber compounds, can be blended with various additives, such as a heat resistance improver, a releaser, a fire retardant, a pigment, a crosslinking agent, and a vulcanizer to be molded and vulcanized.

EXAMPLES

In the following Examples, D represents a degree of polymerization, that is, for example, D3 means that the degree of polymerization is 3.

mixture was press-cured at 165° C. or 10 min and was formed into a sheet having a thickness of 2 mm, and the obtained sheet was postcured at 200° C. for 4 hours. The rubber physical properties of the obtained cured sheet were measured in accordance with JIS K-6301. The results are shown in Table 1.

Incidentally, the hardness was measured by using an A-type spring tester of JIS K-6301.

TABLE 1

|  | Ex. 1 | Ex. 2 | Ex. 3 | Ex. 4 | Ex. 5 |
|---|---|---|---|---|---|
| Dimethylpolysiloxane whose both ends are terminated with silanols | 500 g | 500 g | 500 g | 500 g | 500 g |
| Diethylaminotrimethylsilane | 0.03 g | 0.03 g | 0.03 g | — | 0.03 g |
| Hexamethylsilazane | — | — | — | 0.17 g | — |
| Bis(diethylamino)methylvinylsilane | 1.6 g | 1.6 g | 1.6 g | 1.6 g | 1.6 g |
| Bis(diethylamino)dimethylsilane | 12.8 g | 14.0 g | 14.0 g | 14.0 g | — |
| 1,3-bis(diethylamino)tetramethyldisiloxane | — | — | — | — | 19.2 g |
| Fumed silica | 200 g | — | — | — | — |
| Wet process silica (*2) | — | 200 g | — | — | — |
| Processed silica (*3) | — | — | 200 g | 200 g | 200 g |
| Content of low-molecular siloxanes (D3 to D25) (ppm) | 480 | 450 | 475 | 465 | 460 |
| Williams plasticity | 500 | 410 | 300 | 315 | 300 |
| Rubber physical properties: |  |  |  |  |  |
| Specific gravity | 1.13 | 1.14 | 1.13 | 1.13 | 1.12 |
| Hardness (JIS A) | 44 | 42 | 45 | 44 | 44 |
| Tensile strength (kgf/cm$^2$) | 10 | 30 | 70 | 68 | 73 |
| Elongation (%) | 50 | 250 | 300 | 290 | 310 |

(1) Fumed silica: Aerosil 200 (manufactured by Nippon Aerosil)
(2) Precipitated silica: Nipsil Lp (manufactured by Nippon Silica)
(3) Silica A treated to be made hydrophobic: R812 (manufactured by Degussa)

Examples 1 to 3

500 g of a dimethylpolysiloxane whose both ends are terminated with silanol groups (silanol group content: 0.0195 mol/100g; content of low-molecular siloxanes having D3 to D25: 654 ppm; and average degree of polymerization: 690), 0.03 g of diethylaminotrimethylsilane, 1.6 g of bis(diethylamino)methylvinylsilane, and bis(diethylamino)dimethylsilane in the amount shown in Table 1 were charged into a 3-L kneader and the reinforcing silica shown in Table 1 was mixed with the resulting mixture at room temperature to obtain a slurry mixture.

The obtained mixture was heated and was kept at 150° C. for 5 hours to carry out the polymerization, followed by forced filtering through a 200-mesh metal gauze to obtain a silicone rubber composition.

The content of low-molecular siloxanes and the Williams plasticity of the above composition were measured. The results are shown in Table 1.

Further, 100 parts by weight of the above composition and 0.4 part by weight of 2,5-dimethyl-2,5-ditertiarybutylperoxyhexane were mixed by a two-roll mill, the obtained

Example 4

1,000 g of a dimethylpolysiloxane whose both ends are terminated with silanol groups (silanol group content: 0.020 mol/100g; content of low-molecular siloxanes having D3 to D25: 480 ppm; and average degree of polymerization: 135), 0.6 g of diethylaminotrimethylsilane, 6.4 g of bis(diethylamino)methylvinylsilane, 35 g of bis(diethylamino)dimethylsilane, 450 g of fumed silica whose surface is treated with trimethylsilyl (available under the trade name of R-812S manufactured by Degussa) were preliminarily mixed and then were fed into a two-shaft continuous mixer having a diameter of 40 mm and an L/D of (dwell time: 30 min; and heating temperature: 150° C.). A vent port was provided in the course of the continuous mixer and amines that were given off were removed at the same time. The content of low-molecular siloxanes and the Williams plasticity of the obtained silicone rubber composition were measured and the rubber physical properties of the cured sheet obtained from the composition similarly to Example 1 were measured in accordance with JIS K-6301, the results being shown together in Table 2.

TABLE 2

|  | Ex. 4 |
| --- | --- |
| Content of low-molecular siloxanes (D3 to D25) (ppm) | 410 |
| Williams plasticity | 370 |
| Rubber physical properties: |  |
| Specific gravity | 1.15 |
| Hardness (JIS A) | 49 |
| Tensile strength (kgf/cm$^2$) | 85 |
| Elongation | 350 |

What is claimed is:

1. A method of producing a silicone rubber composition, comprising the steps of:

mixing (A) an organopolysiloxane having a silanol group at both the ends of the molecular chain represented by the following general formula (1):

wherein $R^1$ and $R^2$, which are the same or different, each represent a substituted or unsubstituted monovalent hydrocarbon group and n is an integer of 2 to 3,000, (B) an organosilicon compound represented by the following general formula (2):

wherein a is 1 or 2, $R^3$, $R^4$, and $R^5$, which are the same or different, each represent a monovalent hydrocarbon group which is unsubstituted or substituted by halogen or cyano, when a is 1, Z represents a hydroxyl group, a halogen atom, or —$NR^6R^7$, and when a is 2, Z represents >NX in which $R^6$ and $R^7$, which are the same or different, each represent a substituted or unsubstituted monovalent hydrocarbon group, and X represents a hydrogen atom or a substituted or unsubstituted monovalent hydrocarbon group, (C) a compound represented by the following general formula:

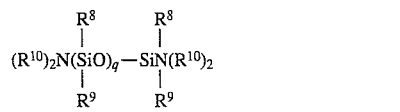

wherein $R^8$ and $R^9$ which are the same or different, each represent a substituted or unsubstituted monovalent hydrocarbon group, $R^{10}$ represents an alkyl group, and q is an integer of 0 to 1,000, and (D) a reinforcing filler, and heating the resulting mixture thereby lengthening the chain of the organopolysiloxane (A).

2. The method of claim 1, wherein the heating is carried out at a temperature of 25° C. to 200° C.

3. The method of claim 1, wherein said organosilicon compound (B) is at least one compound selected from the group consisting of compounds represented by the following formulae:

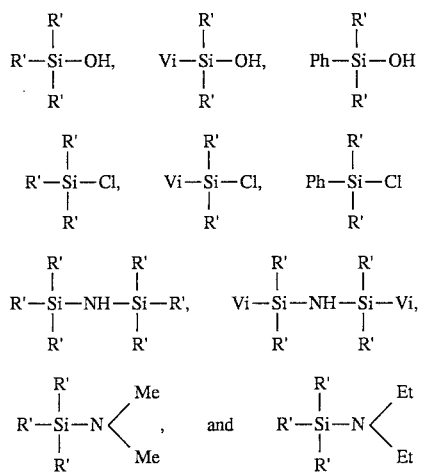

wherein R' represents an alkyl group having 5 or less carbon atoms, Me represents a methyl group, Et represents an ethyl group, Ph represents a phenyl group, and Vi represents a vinyl group.

4. The method of claim 1, wherein the amount of said organosilicon compound (B) is 0.001 to 1 part by weight per 100 parts by weight of the organopolysiloxane (A).

5. The method of claim 1, wherein the amount of said component (C) is such that the molar ratio of the silanol group/dialkyl group in said mixture is from 0.5 to 3.0.

6. The method of claim 1, wherein the amount of said reinforcing filler (D) is 1 to 300 parts by weight per 100 parts by weight of the total amount of said components (A) to (C).

7. The method of claim 1, wherein said reinforcing filler (D) is a reinforcing filler whose surfaces has been treated to be made hydrophobic.

8. A silicone rubber composition prepared by the method of claim 1.

9. The method of claim 1, wherein said organosilicon compound (B) is represented by the formula:

wherein R' represents an alkyl group having 5 or less carbon atoms and the two R" groups are the same or different and each represents a methyl or ethyl group.

* * * * *